R. RAY.
PAN LIFTER.
APPLICATION FILED JULY 22, 1909.
950,189.
Patented Feb. 22, 1910.
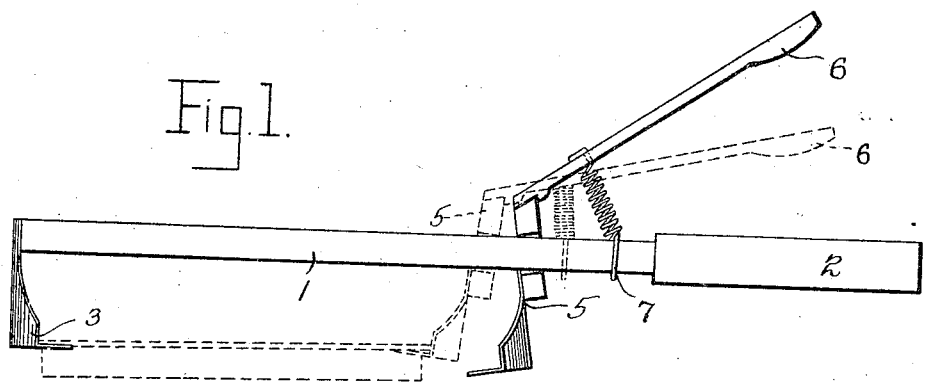
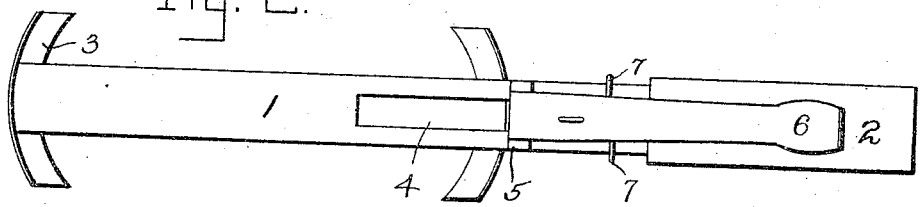
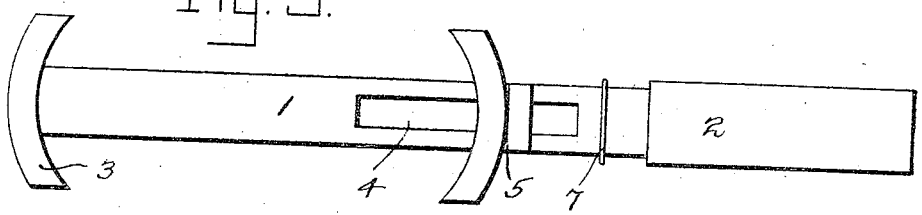
WITNESSES
INVENTOR
Rosa Ray
By Small & Small Attorneys

UNITED STATES PATENT OFFICE.

ROSA RAY, OF EAST PRAIRIE, MISSOURI.

PAN-LIFTER.

950,189.  Specification of Letters Patent.  Patented Feb. 22, 1910.

Application filed July 22, 1909. Serial No. 508,938.

*To all whom it may concern:*

Be it known that I, ROSA RAY, a citizen of the United States, residing at East Prairie, in the county of Mississippi and State of Missouri, have invented certain new and useful Improvements in Pan-Lifters; and I do hereby declare the following to be a full, clear, and exact description of the invention, such as will enable others skilled in the art to which it appertains to make and use the same.

My invention relates to pan lifters with which pans of various kinds and sizes may be handled without danger of burning or soiling the hands or spilling the contents of the pans. This device is also adapted for moving or carrying pots, plates, or dishes, whether hot or cold, with perfect safety.

My lifter will be found especially useful for removing pans or the like from the rear of an oven without first moving others in the front of the oven out of the way.

The principal objects of my invention are to facilitate the gripping of a pan with my lifter, and the releasing thereof from the same.

Other objects are to simplify the construction of the device whereby it may be cheaply manufactured, and to provide against the lifter being accidentally disengaged from a pan while in the act of moving the latter.

The invention consists in the features of construction and combinations of parts hereinafter described and specified in the claims.

In the accompanying drawing illustrating the preferred embodiments of my invention: Figure 1 is a side view of a lifter constructed in accordance with my invention, showing it about to grip a pan, the position of the rocking clutch member and lever, when pressure is exerted on the latter being shown in dotted lines. Fig. 2 is a top plan view of the lifter, and Fig. 3 is an under plan view thereof.

Referring more particularly to the drawing, 1 designates the bar or shank of the lifter, which is provided with a handle 2 at one end, and a fixed clutch member 3 at its other end. A longitudinal slot 4 is formed in a portion of the bar adjacent to the handle and in said slot there is fitted to slide and rock an opposing clutch member 5. The two clutch members are faced in opposite directions and each is arcuate in shape and extends beyond the bar at each side whereby they obtain a firm grip upon the rim of a pan and prevent it from slipping out laterally.

A lever or thumb piece 6 is secured to the clutch member 5 in such manner that when pressure is placed on said lever, it will rock said clutch member forward so as to clamp it into engagement with the rim of a pan the opposite side of which has been engaged by the fixed clutch member 3 thereby clamping the pan securely in the lifter, as illustrated in Fig. 1.

The clutch member 5 is automatically rocked backward out of engagement with the pan, as soon as the pressure is removed from the lever, by means of a spring interposed between said lever and the bar 1. Said spring is fastened to the lever and has sliding connection with the bar preferably by being formed into a loop 7 which loosely embraces said bar. This construction permits the spring to move with the clutch member 5 when the latter is adjusted in the slot 4 to suit the size of the pan to be lifted, whereby said spring has the same automatic releasing action in all adjustments of said clutch member.

I claim:

1. A pan lifter comprising a bar having a fixed clutch member at one end, of a movable clutch member mounted to rock on said bar, a lever secured to said movable clutch member whereby it may be rocked forward to clamp a pan between it and said fixed clutch member, and a spring fastened to said lever whereby said movable clutch member will be automatically rocked backward to release the pan when pressure is removed from said lever.

2. A pan lifter comprising a bar having a fixed clutch member at one end, of a movable clutch member mounted to slide and rock on said bar, a lever secured to said movable clutch member whereby it may be rocked forward to clamp a pan between it and said fixed clutch member, and a spring fastened to said lever and having sliding connection with said bar whereby said movable clutch member will be automatically rocked backward to release the pan when pressure is removed from said lever.

3. A pan lifter comprising a bar having a fixed clutch member at one end, of a movable clutch member mounted to slide and rock on said bar, a lever secured to said movable clutch member whereby it may be rocked forward to clamp a pan between it and said fixed clutch member, and a spring fastened to said lever and having sliding connection with said bar consisting of a loop formed at the end of said spring and loosely embracing the bar whereby said movable clutch member will be automatically rocked backward to release the pan when pressure is removed from said lever.

4. A pan lifter comprising a bar having a longitudinal slot near one end thereof and a fixed clutch member at its other end, of a movable clutch member mounted to slide and rock in said slot, a lever secured to said movable clutch member whereby it may be rocked forward to clamp a pan between it and said fixed clutch member, and a spring fastened to said lever and having sliding connection with said bar whereby said movable clutch member will be automatically rocked backward to release the pan when pressure is removed from said lever.

In testimony whereof, I affix my signature, in presence of two witnesses.

ROSA RAY.

Witnesses:
 FERD BEREUDES,
 J. R. BRYANT.